US012565125B2

(12) United States Patent
Salter et al.

(10) Patent No.: US 12,565,125 B2
(45) Date of Patent: Mar. 3, 2026

(54) VEHICLE HAVING HITCH SUPPORTED TAILGATE SEATING ASSEMBLY

(71) Applicant: Ford Global Technologies, LLC, Dearborn, MI (US)

(72) Inventors: Stuart C. Salter, White Lake, MI (US); Jeff Robert Seaman, Petersburg, MI (US); Annette Lynn Huebner, Highland, MI (US); Michael John Harmon, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 429 days.

(21) Appl. No.: 18/322,047

(22) Filed: May 23, 2023

(65) Prior Publication Data

US 2024/0391363 A1    Nov. 28, 2024

(51) Int. Cl.
| | |
|---|---|
| *B60N 2/14* | (2006.01) |
| *B60N 2/005* | (2006.01) |
| *B60N 2/02* | (2006.01) |
| *B60N 2/04* | (2006.01) |
| *B60N 2/30* | (2006.01) |
| *B60N 3/06* | (2006.01) |
| *B60R 16/03* | (2006.01) |

(52) U.S. Cl.
CPC .............. *B60N 2/14* (2013.01); *B60N 2/3011* (2013.01); *B60N 2/3095* (2013.01); *B60N 3/06* (2013.01); *B60R 16/03* (2013.01); *B60N 2/02246* (2023.08)

(58) Field of Classification Search
CPC ...... B60N 2/14; B60N 2/3011; B60N 2/3095; B60N 3/06
See application file for complete search history.

(56) References Cited

U.S. PATENT DOCUMENTS

| | | | |
|---|---|---|---|
| 5,927,679 A | 7/1999 | Hill | |
| 6,364,391 B1 * | 4/2002 | Everett | B60N 2/3095 |
| | | | 296/57.1 |
| 6,588,822 B1 * | 7/2003 | Duvall, Jr. | B60N 2/3095 |
| | | | 296/57.1 |
| 6,631,938 B1 * | 10/2003 | Burns | B60P 3/36 |
| | | | 297/14 |
| 6,824,186 B2 * | 11/2004 | Brown | B62D 33/0273 |
| | | | 296/65.01 |
| 9,108,533 B2 | 8/2015 | Suck et al. | |
| 9,469,215 B2 | 10/2016 | Mason et al. | |
| 9,694,741 B2 | 7/2017 | Salter et al. | |

(Continued)

FOREIGN PATENT DOCUMENTS

| | | | | |
|---|---|---|---|---|
| CN | 109606219 A | 4/2019 | | |
| DE | 102019210079 A1 * | 1/2021 | .......... | A63C 11/027 |
| JP | 000H06901 U | 1/1994 | | |

*Primary Examiner* — Daniel J Colilla
(74) *Attorney, Agent, or Firm* — Vichet Chea; Price Heneveld LLP

(57) ABSTRACT

A vehicle including a body defining a cabin interior, the body including a tailgate movable between an open position exposing the cabin interior and a closed position closing the cabin interior, a hitch, a deployable seat assembly configured to move between a first position within the cabin interior and a second position extending outside of the cabin interior when the liftgate door is in the open position, and a hitch support mechanism coupled to the seat assembly and configured to connect to the assembly to support the seat assembly in the second position.

17 Claims, 7 Drawing Sheets

(56)     References Cited

U.S. PATENT DOCUMENTS

| | | | |
|---|---|---|---|
| 9,701,225 B1* | 7/2017 | Hogan | ..................... A47C 4/52 |
| 9,896,004 B1 | 2/2018 | Kahl et al. | |
| 10,737,588 B2 | 8/2020 | Fujita et al. | |
| 2004/0256894 A1 | 12/2004 | McManus et al. | |
| 2005/0253433 A1 | 11/2005 | Brown et al. | |
| 2006/0284438 A1 | 12/2006 | Carty | |
| 2009/0079248 A1 | 3/2009 | Keyser et al. | |
| 2012/0104786 A1 | 5/2012 | Wimberley | |
| 2016/0144744 A1 | 5/2016 | Jeong et al. | |
| 2019/0217748 A1 | 7/2019 | Krnja | |
| 2020/0269728 A1 | 8/2020 | Pelka | |
| 2021/0162887 A1 | 6/2021 | Taylor | |
| 2021/0178940 A1 | 6/2021 | Fakhoury | |
| 2022/0136297 A1* | 5/2022 | Roberson | ............. E05D 15/262 |
| | | | 49/37 |
| 2022/0204096 A1* | 6/2022 | Goodenough | ..... B62D 33/0273 |
| 2022/0379780 A1 | 12/2022 | Salter et al. | |
| 2022/0396186 A1 | 12/2022 | Salter et al. | |
| 2025/0256625 A1* | 8/2025 | Atkinson | ............. B60N 2/3065 |

* cited by examiner

VEHICLE HAVING HITCH SUPPORTED TAILGATE SEATING ASSEMBLY

FIELD OF THE DISCLOSURE

The present disclosure generally relates to vehicles seating assemblies, and more particularly relates to a vehicle rear seat assembly that can be deployed to a rearward facing tailgate seating position.

BACKGROUND OF THE DISCLOSURE

Motor vehicles are commonly equipped with front and rear rows of seating to provide seating for passengers. Some vehicles may be equipped with tailgate seating to allow one or more passengers to be seated at the rear end of the vehicle facing rearward with the tailgate open when the vehicle is parked. It would be desirable to provide for a seating arrangement for a vehicle that offers deployable tailgate seating that is efficient and easy to use.

SUMMARY OF THE DISCLOSURE

According to a first aspect of the present disclosure, a vehicle is provided and includes a body defining a cabin interior, the body including a tailgate movable between an open position exposing the cabin interior and a closed position closing the cabin interior, a hitch, a deployable seat assembly configured to move between a first position within the cabin interior and a second position extending outside of the cabin interior when the liftgate door is in the open position, and a hitch support mechanism coupled to the seat assembly and configured to connect to the hitch to support the seat assembly in the second position.

Embodiments of the first aspect of the present disclosure can include any one or a combination of the following features:

a deployment mechanism operative to move the seat assembly between the first and second positions;

the deployment mechanism comprises a seat rotator assembly operable to rotate the seat assembly between the first position facing forward within the cabin interior and the second position facing rearward outside of the cabin interior;

the seat assembly comprises a seat base and a seat back, wherein the hitch support mechanism is connected to the seat base in the second position;

the hitch support mechanism comprises a reconfigurable support arm having a first end coupled to the seat base and a second end configured to connect in a receiver of the hitch;

the reconfigurable support arm comprises a first support bar pivotably connected to a second support bar, wherein the reconfigurable support arm folds under the seat base when the seat assembly is in the first position within the cabin interior;

an electrical hitch connector configured to supply electrical power, wherein the seat assembly comprises an electrical connector configured to connect to the first hitch connector to power one or more electrically powered devices associated with the seat assembly;

a footrest coupled to the seat assembly, wherein the footrest extends to a deployed footrest position from a stored position;

the seat assembly is configured in a rear facing direction in the second position;

the seat assembly is configured in a rearward facing direction in the second position outside the cabin interior; and a seat rotator assembly that rotates the seating assembly between the first position in the forward facing seating direction within the cabin interior and the second position in the rear facing seating direction.

According to a second aspect of the present disclosure, a vehicle is provided including a body defining a cabin interior, the body including a tailgate movable between an open position exposing the cabin interior and a closed position closing the cabin interior, a hitch having a receiver end, a deployable seat assembly configured to move between a first position within the cabin interior and a second position extending outside of the cabin interior and facing rearward when the liftgate is in the open position, and a hitch support mechanism coupled to the seat assembly and configured to connect to the receiver end of the hitch to support the seat assembly in the second position, wherein the hitch support mechanism comprises a reconfigurable support arm having a first end connected to the seat assembly and a second end having a plug configured to engage the receiver end of the hitch.

An embodiment of the second aspect of the present disclosure can include the following feature:

the reconfigurable support arm comprises a first support bar pivotably connected to a second support bar wherein the reconfigurable support arm folds under the seat base when the seat assembly is in the first position within the cabin interior.

According to a third aspect of the present disclosure, a seat assembly for a vehicle is provided. The seat assembly including a seat and seat base configured to move between a first position within a cabin interior of the vehicle and a second position extending outside of the cabin interior when a liftgate of the vehicle is in the open position, a deployment mechanism configured to move the seat and seat base between the first, and second positions, and a hitch support mechanism coupled to the seat assembly and configured to connect to a hitch of the vehicle to support the seat assembly in the second position.

Embodiments of the third aspect of the present disclosure can include any one or a combination of the following features:

the hitch support mechanism comprises a reconfigurable support arm having a first end coupled to the seat base and a second end configured to connect in a receiver of the hitch;

the reconfigurable support arm comprises a first support bar pivotably connected to a second support bar, wherein the reconfigurable support arm folds under the seat base when the seat assembly is in the first position within the cabin interior;

the hitch support mechanism comprises a first pivot connection coupling the first support arm to the seat base and a second pivot connection coupling the first support arm to the second support arm;

an electrical connector configured to power source connector on the vehicle to power one or more electrically powered devices associated with the seat assembly;

a footrest coupled to the seat assembly, wherein the footrest extends to a deployed footrest position from a stored position; and the deployment mechanism comprises a seat rotator assembly operable to rotate the seat assembly between the first position facing forward within the cabin interior and the second position facing rearward outside of the cabin interior.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
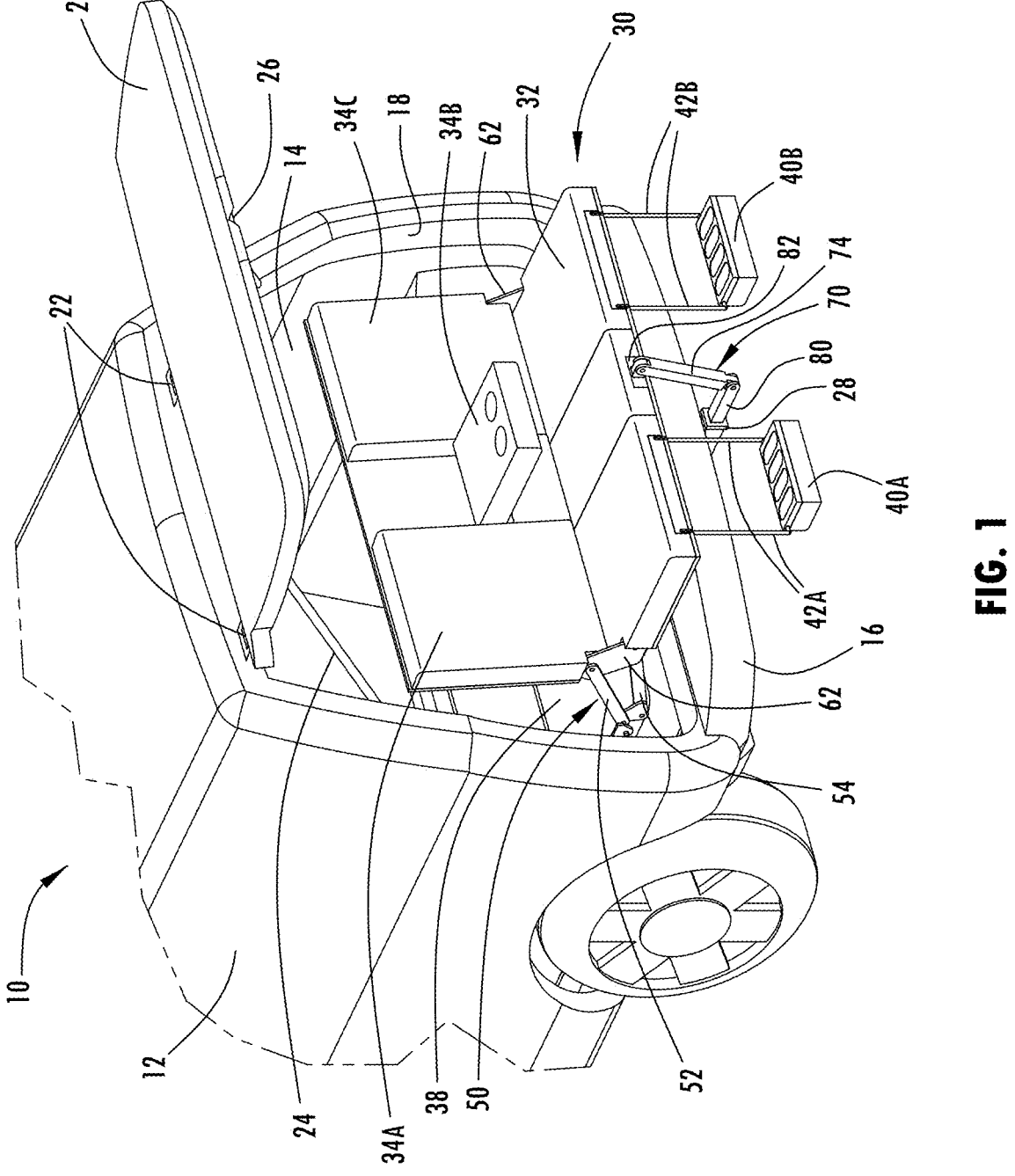
FIG. 1 is a rear perspective view of a motor vehicle having a seat assembly arranged in a rearward facing tailgating position, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper." "lower." "right." "left," "rear," "front." "vertical." "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a deployable seat assembly that may be deployed to a rearward facing tailgating position to offer secure and stable tailgate seating. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially." and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, the cabin interior 14 of a wheeled automotive or motor vehicle 10 is generally illustrated configured with passenger seating for transporting passengers in the vehicle 10 and with a deployable seat assembly 30 to provide rear facing tailgate seating when a rear tailgate is open and the vehicle is parked and not moving. The cabin interior 14 is generally defined by a vehicle body 12 and may include various features and trim components within the cabin interior 14. The cabin interior 14 may include an arrangement of passenger seats, including a first or front row of driver and passenger seats (not shown) at the front of the cabin interior 14 and one or more rear rows of passenger seats including a deployable seat assembly 30 located rearward of the front row of passenger seats.

Figure 2:
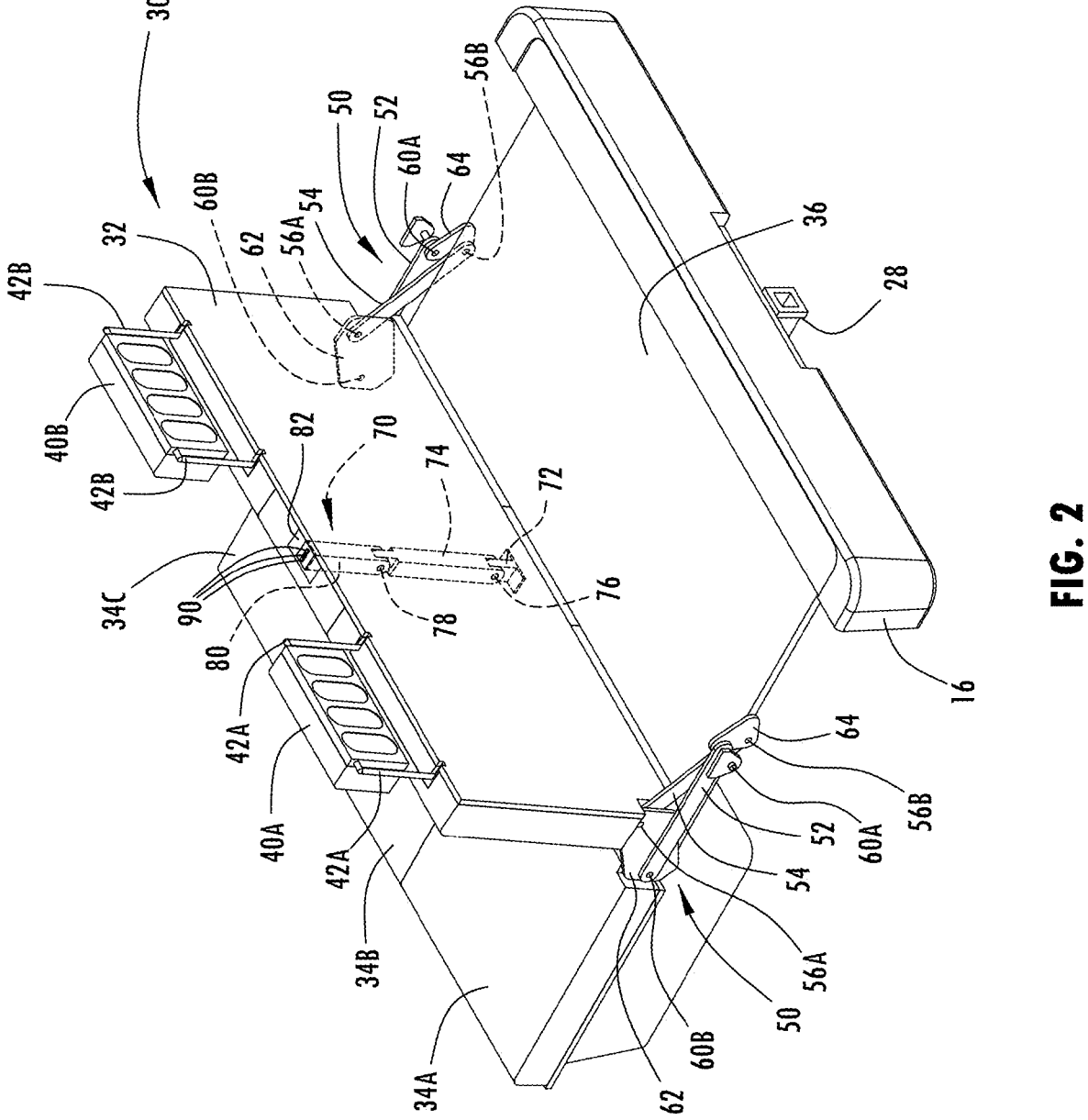
FIG. 2 is a rear perspective view of the seating assembly shown in a forward facing position.

The vehicle 10 includes the deployable seat assembly 30 that is deployable to provide rear facing tailgate seating at the rear end of the vehicle 10. In the embodiment shown, the seat assembly 30 may be rotated between a forward facing position as shown in FIG. 2 and a rearward facing tailgate position shown in FIG. 1. According to another embodiment, the seat assembly 30 may be deployed between a stowed position and the rearward facing tailgate position. The seat assembly 30 is generally shown in one embodiment as a split bench seat having a seat panel 32 and three split seat panels 34A. 34B and 34C generally oriented at an angle of about 90°-120° relative to each other to form a seating configuration. However, it should be appreciated that the seat assembly 30 may include a bench seat or individual seats (e.g., captains' seats), according to other embodiments.

The vehicle 10 may also possess additional rows of seating, as is typical in large SUVs, vans and buses with the deployable seat assembly 30 being the rearward most row of seating. The cabin interior 14 further has a floor that includes a front floor 38 and a rear floor 36 which the seating arrangement is supported. It should be appreciated that the vehicle 10 may be a motor vehicle, such as a wheeled car, truck, SUV, van or bus, for example, having a tailgate and capable of transporting one or more passengers and for seating one or more passengers in forward seating positions and for seating one or more passengers in the rearward facing tailgate seating position of the seat assembly 30 when the vehicle is parked and not moving.

The vehicle 10 includes a tailgate 20 at the rear end 18 of the body 12 that provides a pivoting door closure. The tailgate 20 is shown configured as an upper tailgate that defines a tailgate closure that closes an opening 18 to the cabin interior 14 defined by the body 12 at the rear end 16 of the vehicle 10 in the closed tailgate position, and allows access to the cabin interior 14 and allows the seat assembly 30 to extend rearward from the cabin interior 14 in the open tailgate position. The tailgate 20 pivots about a pair of upper hinges 22 which may be located on opposite lateral sides and is supported in the open tailgate position as shown in FIG. 1 by a pair of support arms 24 on opposite lateral sides. The tailgate 20 may be substantially vertical in the closed position and may rotate to the open position at or above a horizontal position by an angle in the range of about 90°-120°, for example. The tailgate 20 may include a connector such as a latch 26 that releasably connects onto a striker bolt or other connector on the vehicle body 12 in the closed tailgate position.

In various embodiments, the tailgate 20 may be manually movable between the open and closed tailgate positions or may be powered to move between the open and closed tailgate positions with one or more actuators, such as electric motors, and may include an assist mechanism, e.g., springs, for assisting in moving the tailgate 20 between the open and closed tailgate positions. It should be appreciated that the tailgate 20 may otherwise be configured to include a lower tailgate that pivots to a substantially horizontal position in the open tailgate position and an upper tailgate that matingly engages the upper end of lower tailgate to form the tailgate closure in the closed tailgate position. Further, other vehicle tailgates are conceivable, such as one or more tailgate doors that pivot about vertical hinges, for example.

Referring to FIG. 2, the seat assembly 30 is generally illustrated in a forward seating position having seat panels 34A-34C supported substantially in a horizontal orientation on or above the front floor 38 of the vehicle 10 to form a seat base and the seat panel 32 extending upright to form a seat back in the forward facing position. As such, the seat assembly 30 provides a rear row of forward facing seats when arranged in the forward facing position. In the forward facing position, the seat assembly 30 employs the seat panel 34A, 34B and 34C as seat bases while seat panel 32 serves as a seat back. The seat panel 32 also includes a pair of extendible members 40A and 40B which in the forward facing seating position serve as headrests. Each of the extendible members 40A and 40B are connected to the outer or top end of the seat panel 32 via pairs of posts 42A and 42B respectively, which extend into openings in the seat panel 32 and are extendible by a user between one or more extended positions extending at a distance above the seat panel 32 and a retracted position proximate to the end of the seat panel 32. The extension distance of the posts 42A and 42B may be adjustable in length to various positions and secured in place to adjust each extendible member to a comfort position for a passenger seated on the seat assembly 30.

Figure 5:
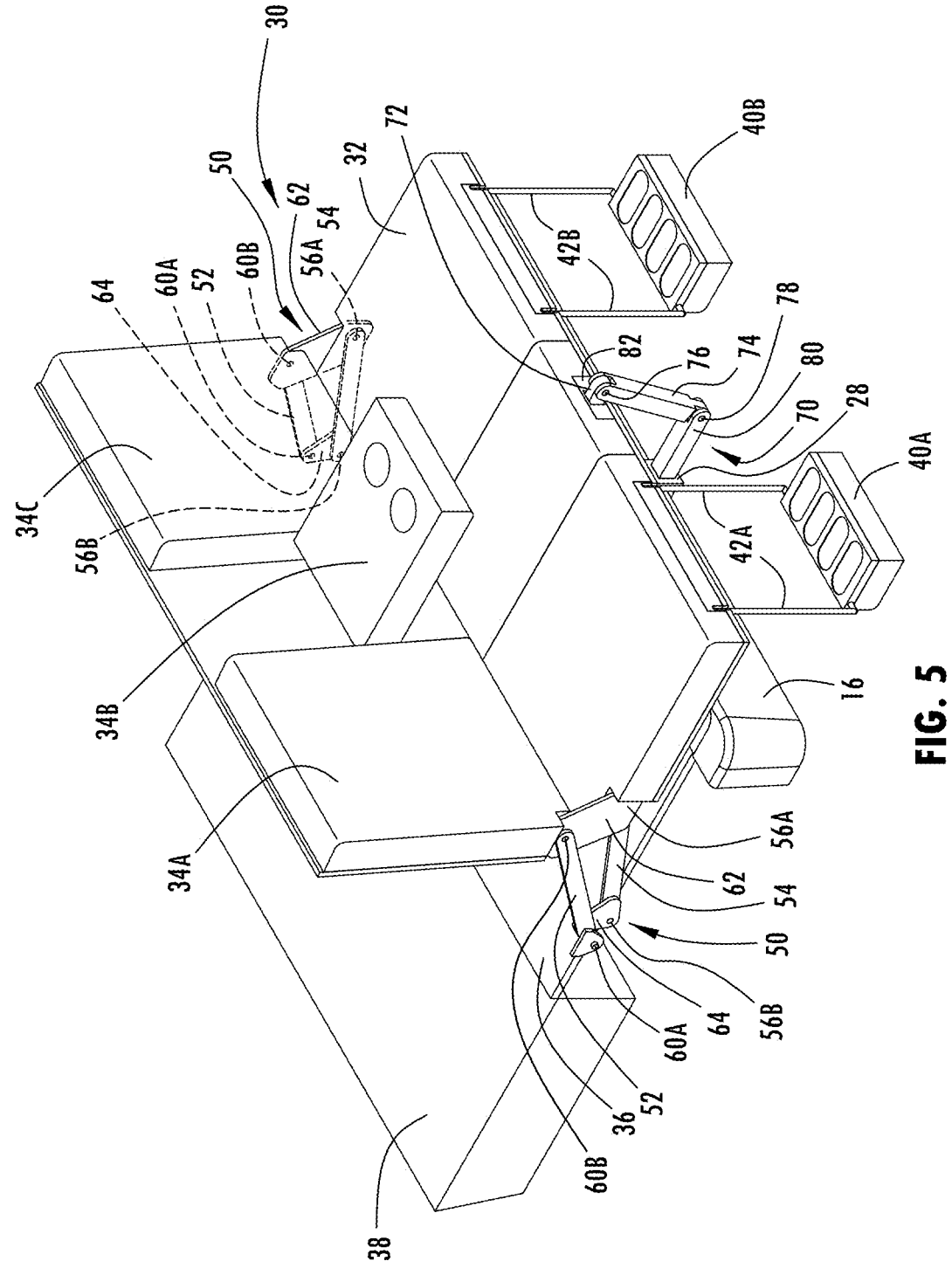
FIG. 5 is a rear perspective view of the seating assembly shown fully deployed in the rearward facing tailgating position.
Figure 6:
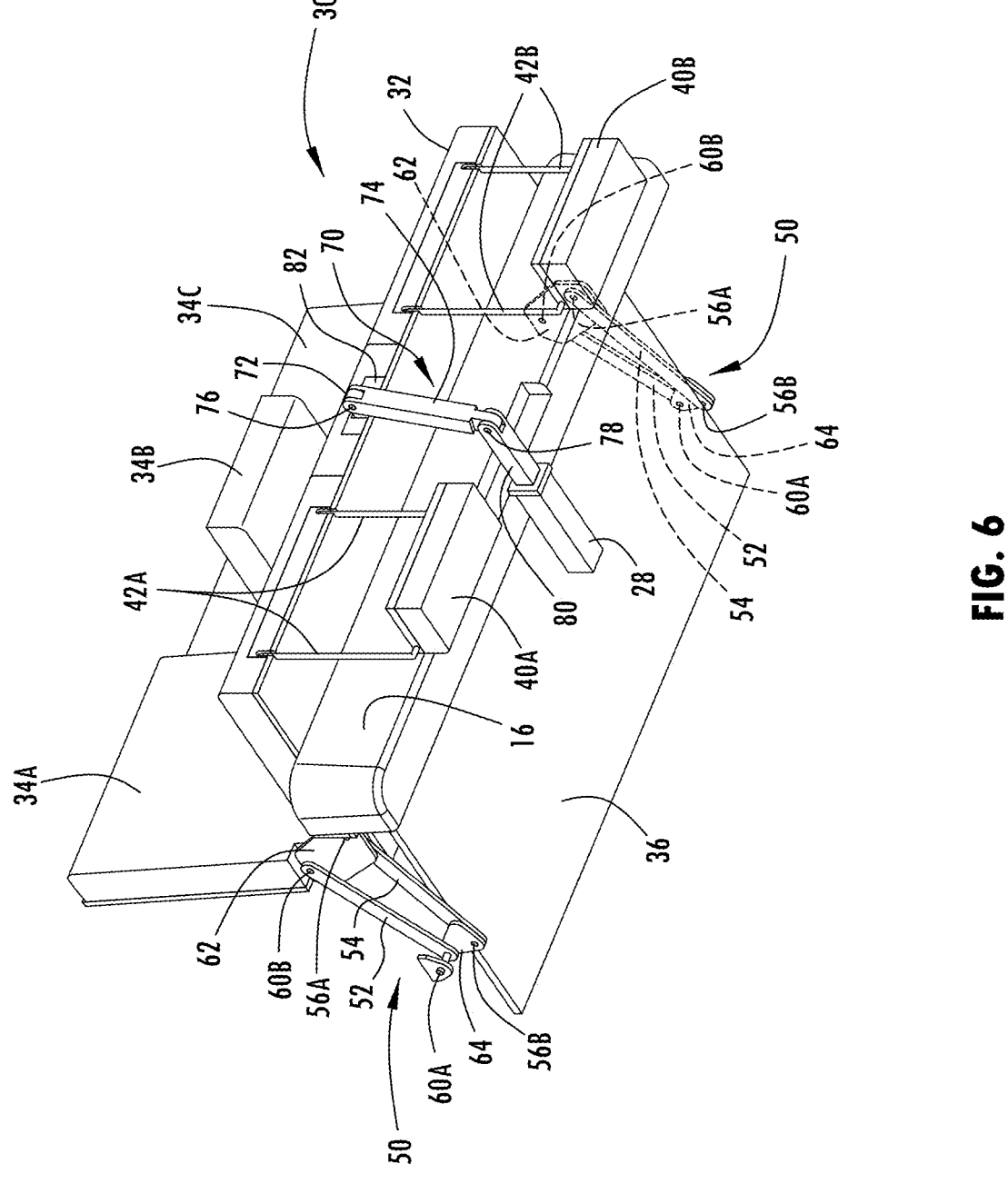
FIG. 6 is a lower perspective view of the seating assembly shown in FIG. 5 in the fully deployed rearward facing tailgate position.
Figure 7:
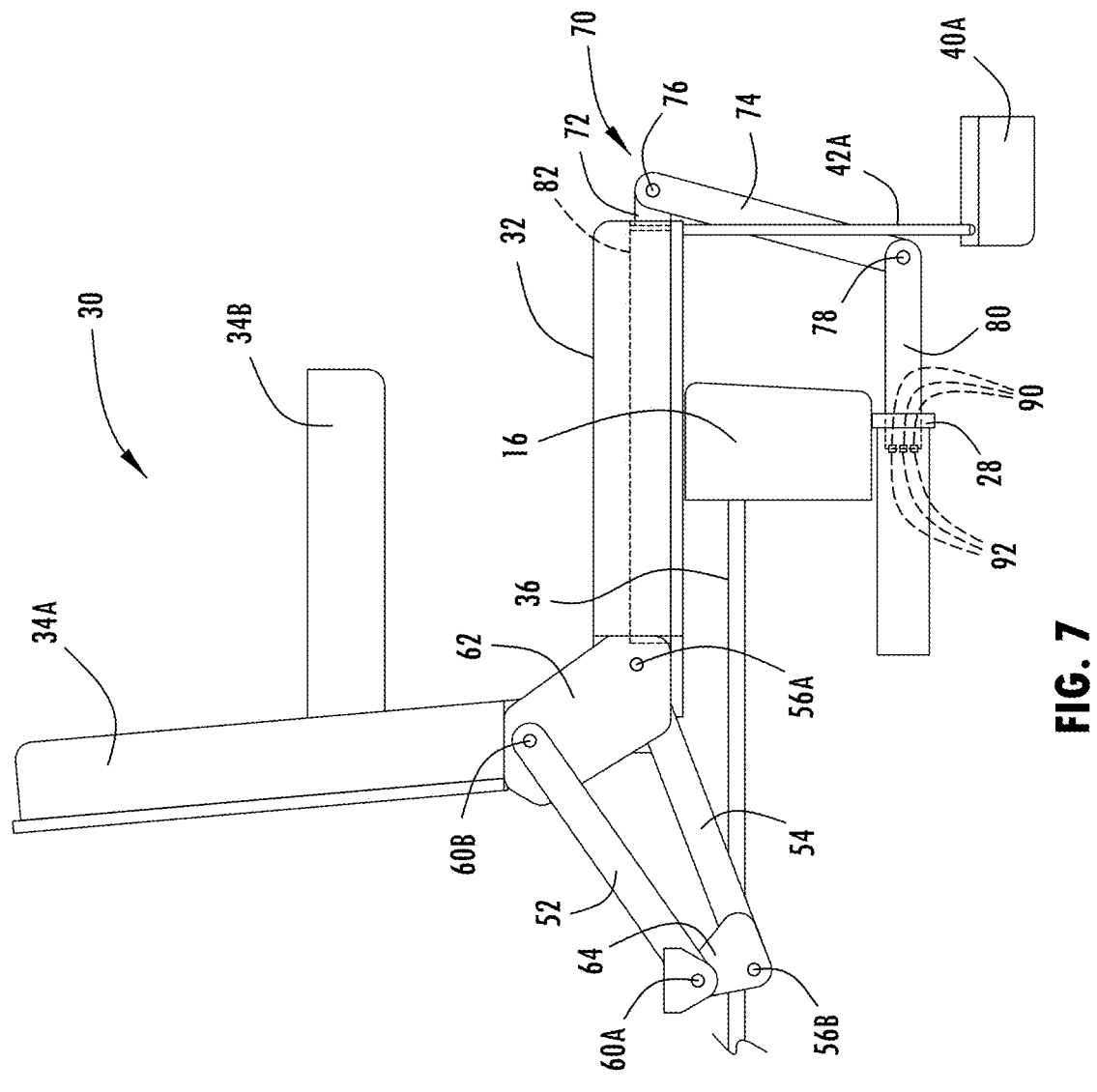
FIG. 7 is a side view of the seating assembly as shown in FIG. 5 in the fully deployed rearward facing tailgate position.

The seat assembly 30 is rotatable from the forward facing first position shown in FIG. 2 to a rear facing tailgating second position shown in FIGS. 1 and 5. This is achieved by rotating the seat assembly approximately 90° clockwise and rearward into a rotated or flipped position such that the seat panel 32 serves as a seat base and the seat panels 34A-34C serve as seat backs in the rearward facing tailgating second position. To achieve the rotation of the seat assembly 30 between the forward facing first position and the rearward facing tailgating second position, the seat assembly 30 includes a seat rotator assembly 50 that connects the seat assembly 30 to a rear floor 36 or other supporting structure and rotates the seat assembly 30. The seat rotator assembly 50 includes a first rotating bar 52 pivotally connected at one end to bracket 64 connected to the rear floor 36 and a side support plate 62 on the opposite end on the seat assembly 30 which, in turn, connects to the seat panels 32 and 34A-34C. The first rotating bar 52 has a first pivot connection 60A at one end connected to a bracket 64 which connects to the rear floor 36 and a second pivot connection 60B at the opposite end which connects to the side support plate 62. The seat rotator assembly 50 also includes a second rotating bar 54 which connects to the side support plate 62 at one end and the bracket 64 connected to the rear floor 36 at the opposite end. The second rotator bar 54 has a first pivot connection 56A connected to side support plate 62 and a second pivot connection 56B at the opposite end connected to the bracket 64 connected to the rear floor 36.

It should be appreciated that the seat assembly 30 includes a seat rotator assembly 50 on each of the opposite lateral sides of the seat assembly 30. The seat rotator assemblies 50 support the seat panels 32 and 34A-34C and together direct the rotational movement of the seat assembly 30 on opposite lateral sides between the forward facing first position and the rearward facing tailgating second position. The first and second rotating bars 52 and 54 are spaced apart from one another and rotate in different longitudinal planes together to rotate the seat assembly 30 approximately 90°. In doing so, the first and second rotating bars 52 and 54 each may rotate through angles in the range of about 90°-135°, for example, and cross one another on different parallel planes during the rotation.

Figure 3:
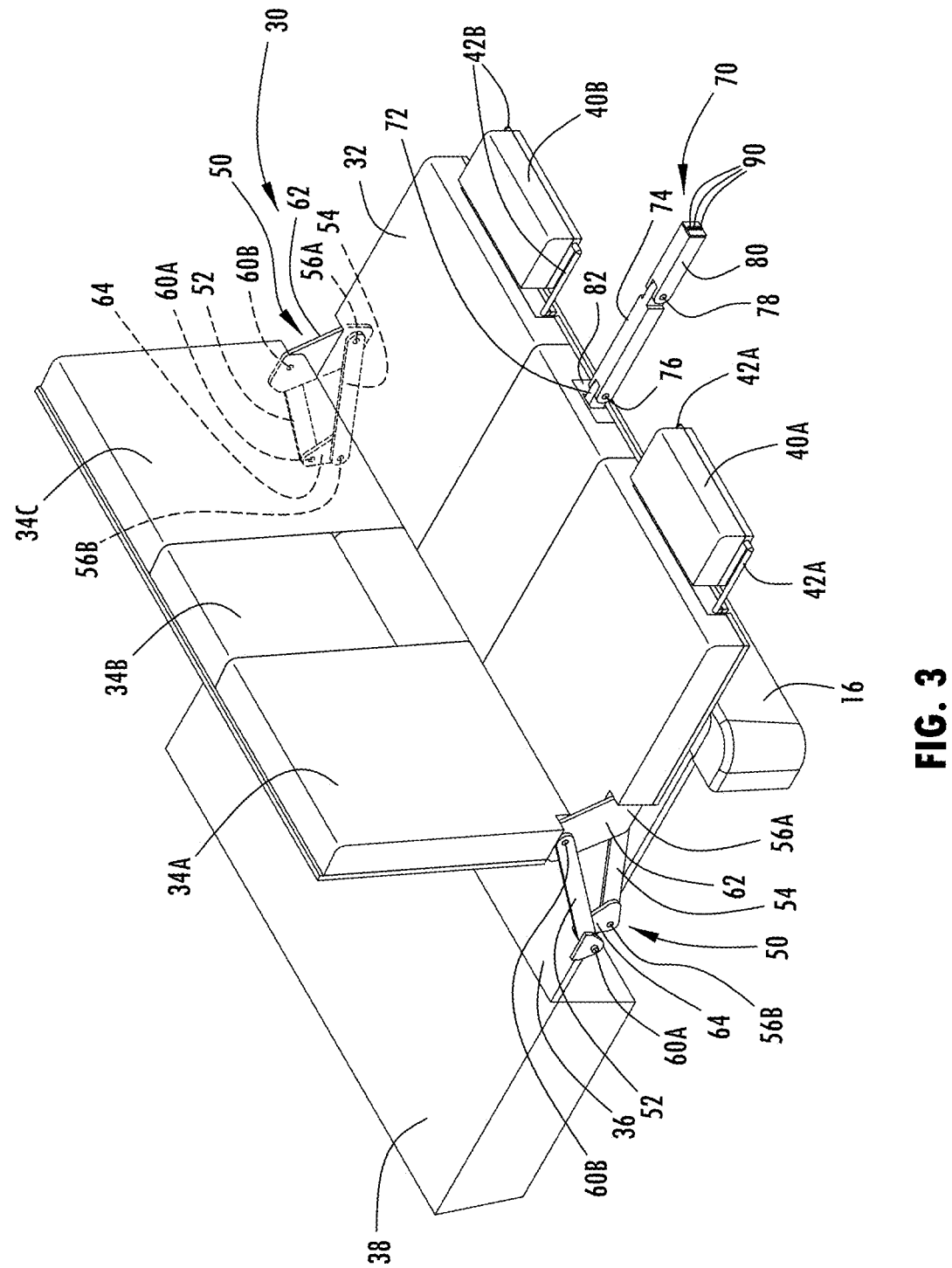
FIG. 3 is a rear perspective view of the seating assembly as shown in FIG. 2 rotated rearward and partially deployed in the rearward facing tailgating position.

To move the seat assembly 30 from the forward facing first position shown in FIG. 2 to the rearward facing tailgating second position shown in FIG. 5, the seat panels 34A-34C are rotated either manually or actuated by an actuator, such as an electric motor, to rotate about first and second rotating bars 52 and 54 of the seat rotator assembly 30 on both sides of the seat assembly 30 to the position shown in FIG. 3. In this position, the horizontal seat panel 32 extends above and beyond the rear end 16 of the vehicle 10, particularly the bumper. In this position, the seat panel 32 may be elevated above the bumper at the rear end 16 of the vehicle 10 and is supported by a hitch support mechanism 70.

Figure 4:
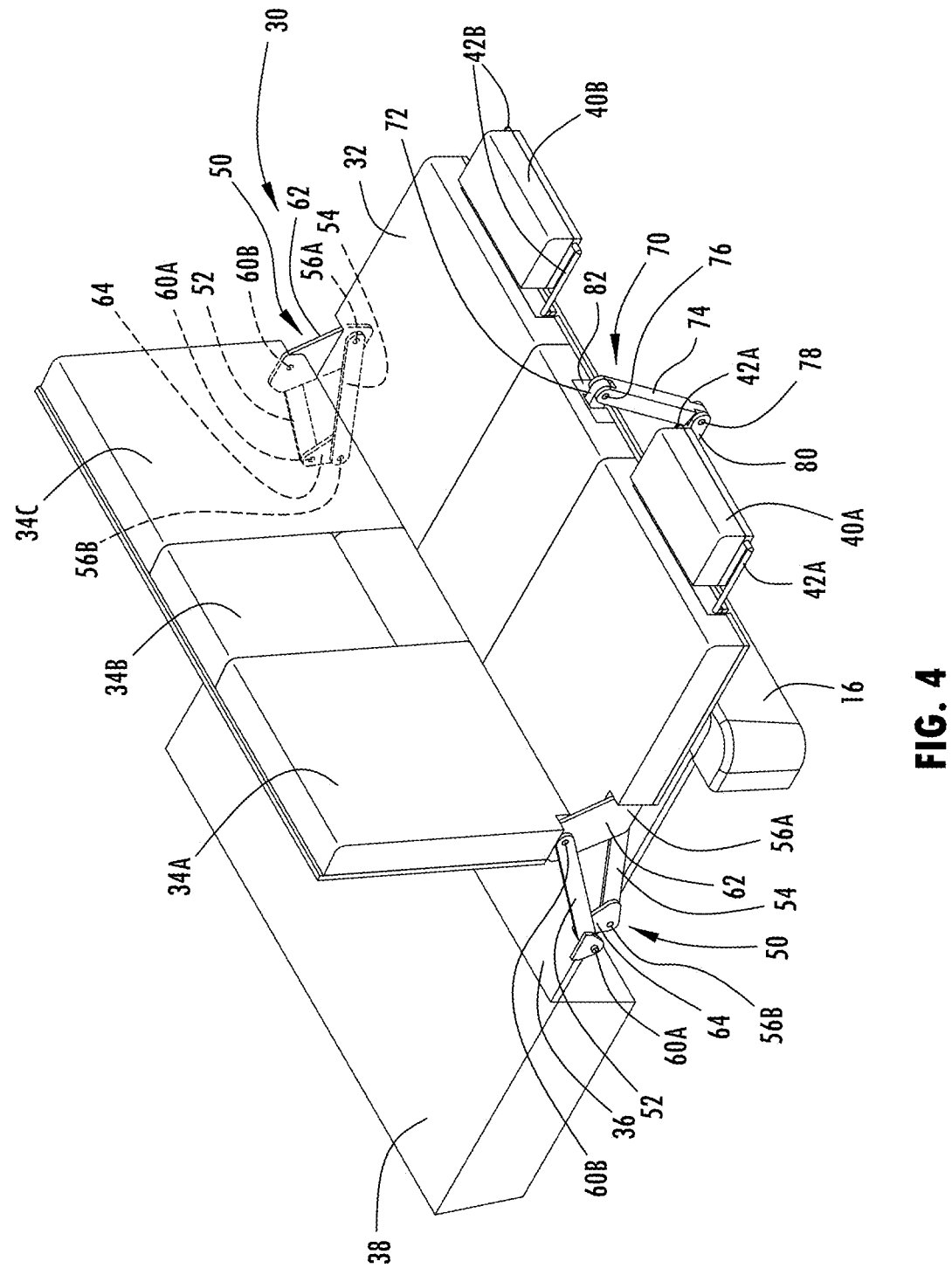
FIG. 4 is a rear perspective view of the seating assembly shown further partially deployed to the rearward facing tailgating position.

The hitch support mechanism 70 is shown stored in and extendible from a space 82 within the seat panel 32 such that in the second position of the seat assembly 30 the hitch support mechanism 70 may be pulled out to a rearward position and repositioned to engage the hitch 28 at the rear end of the vehicle 10. In doing so, the hitch support mechanism 70 is pulled rearward with manual force out of space 82 as seen in FIG. 3 and is rotated downward and further rotated into position to matingly connect to the hitch 28. This is achieved by employing the hitch support mechanism 70 which includes a first support bar 74 pivotally connected via a first pivot connector 76 (e.g., hinge) to a sliding bracket 72. The sliding bracket 72 is slidably engaged in the opening 82 to slide inward to the stowed position and outward to a deployed position. The first support bar 74 is pivotally connected via a second pivot connector 78 to a second support bar 80 which serves as a hitch plug having a shape and size configured to fit in the receiver end of the hitch 28. As such, the first support bar 74 may be pivoted about the first pivot connector 76 and the second support bar 80 may pivot about the second pivot connector 78 to reposition the hitch support mechanism 70 to conform to a shape to be positional and received within the receiver end of the hitch 28 as shown in FIGS. 4 and 5. In this position, the vehicle hitch 20 supports the seat assembly 30 and any load provided by one or more users seated on the seat assembly 30. The second support bar 80 which serves as the hitch plug may frictionally engage hitch 28 and in addition may be connected thereto via a hitch pin or other connector.

The hitch support mechanism 70 may further include electrical contacts 90 configured to make electrical contact with electrical contacts 92 within the hitch 28 to provide electrical power from the power supply (e.g., battery) on the vehicle 10 to one or more devices onboard the seat assembly 30. The electrical contacts 90 and 92 transmit electrical power from the vehicle 10 to power illumination devices that may be provided such as ambient lighting around the cupholders and lighting on seat panel 32 that illuminates the footrests and ground below and rearward of the vehicle 10, and elsewhere on the seat assembly 30. In the example shown, three contacts 90 are provided on the terminal end of the second support bar 80. One or more communication contacts may be included to provide communication with one or more devices provided on the seat assembly 30. In another example, the electrical trailer connector may be provided to plug into the vehicle trailer electrical connector to couple with the electrical power.

The seat assembly 30 further is deployable in the rearward facing seating position to use the extendible members 40A and 40B as footrests positioned below the seating area as seen in FIGS. 1 and 5. In order to do so, the extendible members 40A and 40B are extended from openings within the edge of the seat panel 32 to extend the respective posts 42A and 42B and allow the extendible members 40A and 40B to extend downward to form a footrest. As such, a user seated upon the seat panel 32 may position their feet on top of the extended members 40A and 40B.

Accordingly, the deployable seat assembly 30 advantageously provides for a stowable and deployable rear facing tailgate seating arrangement that may be further utilized as a forward facing seat within the cabin interior of the vehicle 10 and may be deployed to a tailgating position when the vehicle is parked and not moving. The seating assembly 30 is supported by the hitch support mechanism 70 which adds structural support and allows for a reduced weight seat assembly.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a body defining a cabin interior, the body including a tailgate movable between an open position exposing the cabin interior and a closed position closing the cabin interior;
   a hitch;
   a deployable seat assembly configured to move between a first position within the cabin interior and a second position extending outside of the cabin interior when the liftgate is in the open position;
   a hitch support mechanism coupled to the seat assembly and configured to connect to the hitch to support the seat assembly in the second position;
   a deployment mechanism operative to move the seat assembly between the first and second positions, wherein the deployment mechanism comprises a seat rotator assembly operable to rotate the seat assembly between the first position facing forward within the cabin interior and the second position facing rearward outside of the cabin interior.

2. The vehicle of claim 1, wherein the seat assembly comprises a seat base and a seat back, wherein the hitch support mechanism is connected to the seat base in the second position.

3. The vehicle of claim 2, wherein the hitch support mechanism comprises a reconfigurable support arm having a first end coupled to the seat base and a second end configured to connect in a receiver of the hitch.

4. The vehicle of claim 3, wherein the reconfigurable support arm comprises a first support bar pivotally connected to a second support bar, wherein the reconfigurable support arm folds under the seat base when the seat assembly is in the first position within the cabin interior.

5. The vehicle of claim 1 further comprising an electrical hitch connector configured to supply electrical power, wherein the seat assembly comprises an electrical connector configured to connect to the electrical hitch connector to power one or more electrically powered devices associated with the seat assembly.

6. The vehicle of claim 1 further comprising a footrest coupled to the seat assembly, wherein the footrest extends to a deployed footrest position from a stored position.

7. The vehicle of claim 1, wherein the seat assembly is configured in a rear facing direction in the second position.

8. A vehicle comprising:
   a body defining a cabin interior, the body including a tailgate movable between an open position exposing the cabin interior and a closed position closing the cabin interior;
   a hitch;
   a deployable seat assembly configured to move between a first position within the cabin interior and a second position extending outside of the cabin interior when the liftgate is in the open position; and
   a hitch support mechanism coupled to the seat assembly and configured to connect to the hitch to support the seat assembly in the second position, and wherein the seat assembly is configured in a rear facing direction in the second position outside the cabin interior.

9. The vehicle of claim 8 further comprising a seat rotator assembly that rotates the seating assembly between the first position in the forward facing seating direction within the cabin interior and the second position in the rear facing seating direction.

10. A vehicle comprising:
   a body defining a cabin interior, the body including a tailgate movable between an open position exposing the cabin interior and a closed position closing the cabin interior;
   a hitch having a receiver end;
   a deployable seat assembly configured to move between a first position within the cabin interior and facing forward and a second position extending outside of the cabin interior and facing rearward when the liftgate is in the open position; and
   a hitch support mechanism coupled to the seat assembly and configured to connect to the receiver end of the hitch to support the seat assembly in the second position, wherein the hitch support mechanism comprises a reconfigurable support arm having a first end connected to the seat assembly and a second end having a plug configured to engage the receiver end of the hitch.

11. The vehicle of claim 10, wherein the reconfigurable support arm comprises a first support bar pivotably connected to a second support bar wherein the reconfigurable support arm folds under the seat base when the seat assembly is in the first position within the cabin interior.

12. A seat assembly for a vehicle, the seat assembly comprising:
   a seat and seat base configured to move between a first position within a cabin interior of the vehicle and a second position extending outside of the cabin interior when a liftgate of the vehicle is in the open position;
   a deployment mechanism configured to move the seat and seat base between the first, and second positions; and
   a hitch support mechanism coupled to the seat assembly and configured to connect to a hitch of the vehicle to support the seat assembly in the second position, wherein the hitch support mechanism comprises a reconfigurable support arm having a first end coupled to the seat base and a second end configured to connect in a receiver of the hitch.

13. The seat assembly of claim 12, wherein the reconfigurable support arm comprises a first support bar pivotably connected to a second support bar, wherein the reconfigurable support arm folds under the seat base when the seat assembly is in the first position within the cabin interior.

14. The seat assembly of claim 13, wherein the hitch support mechanism comprises a first pivot connection coupling the first support arm to the seat base and a second pivot connection coupling the first support arm to the second support arm.

15. The seat assembly of claim 12 further comprising an electrical connector configured to power one or more electrically powered devices associated with the seat assembly.

16. The seat assembly of claim 12 further comprising a footrest coupled to the seat assembly, wherein the footrest extends to a deployed footrest position from a stored position.

17. The seat assembly of claim 12, wherein the deployment mechanism comprises a seat rotator assembly operable to rotate the seat assembly between the first position facing forward within the cabin interior and the second position facing rearward outside of the cabin interior.

* * * * *